May 9, 1967  G. E. ROWE  3,318,433
APPARATUS FOR MOVING GLASS CONTAINERS ONTO A MOVING CONVEYOR
Filed Nov. 5, 1965  5 Sheets-Sheet 1
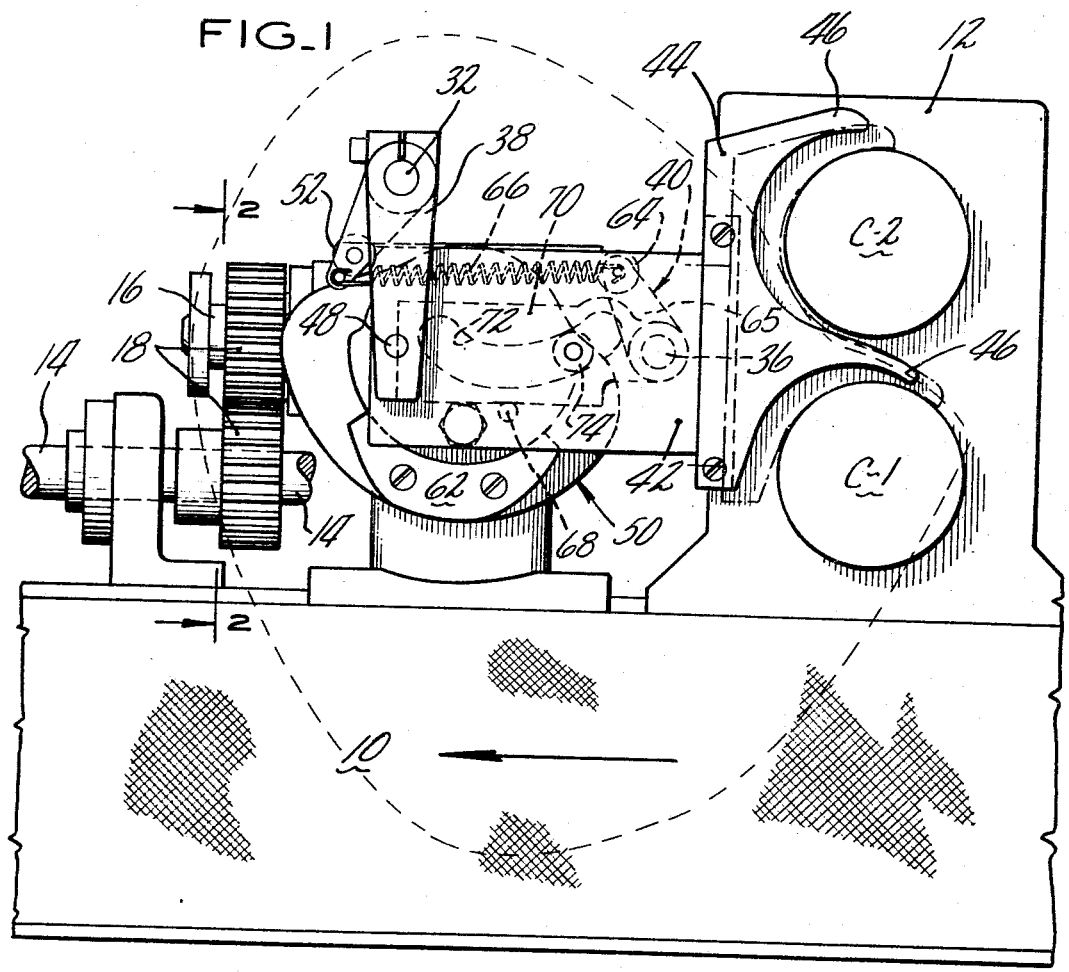
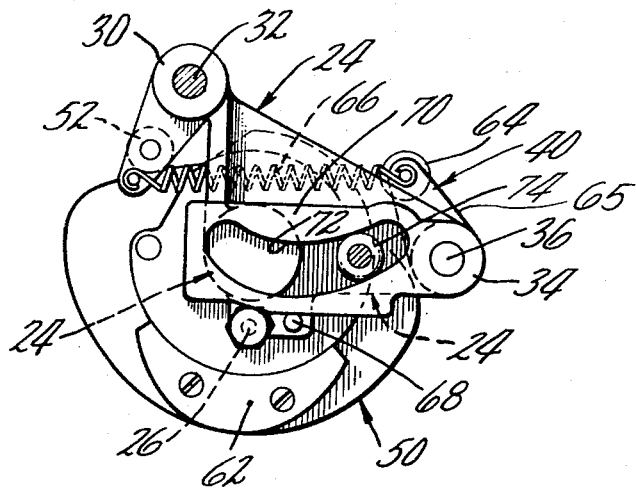
INVENTOR
GEORGE E. ROWE
BY McCormick, Paulding & Huber
ATTORNEYS

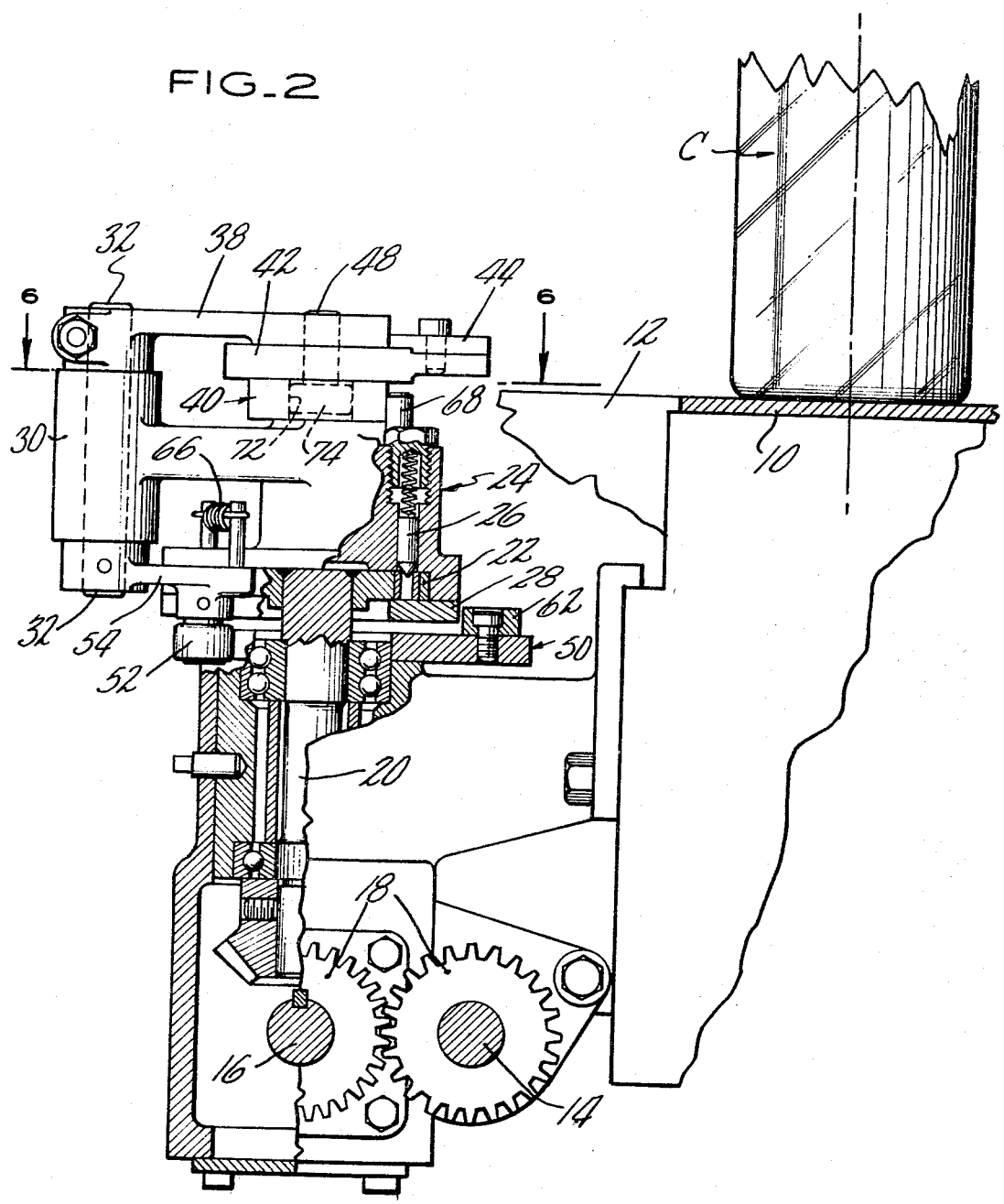

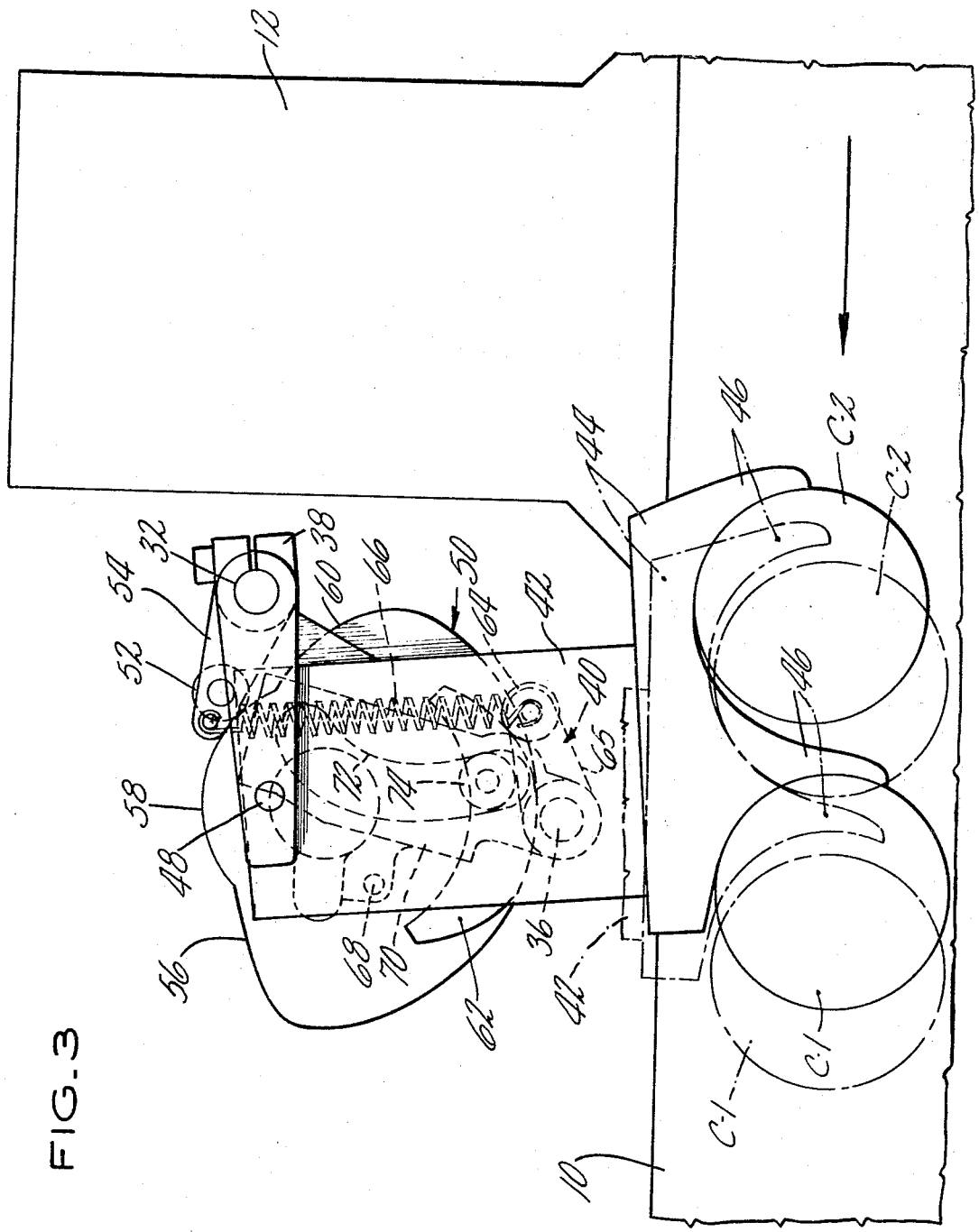

May 9, 1967 G. E. ROWE 3,318,433
APPARATUS FOR MOVING GLASS CONTAINERS ONTO A MOVING CONVEYOR
Filed Nov. 5, 1965 5 Sheets-Sheet 4

INVENTOR
GEORGE E. ROWE
BY McCormick, Paulding & Huber
ATTORNEYS

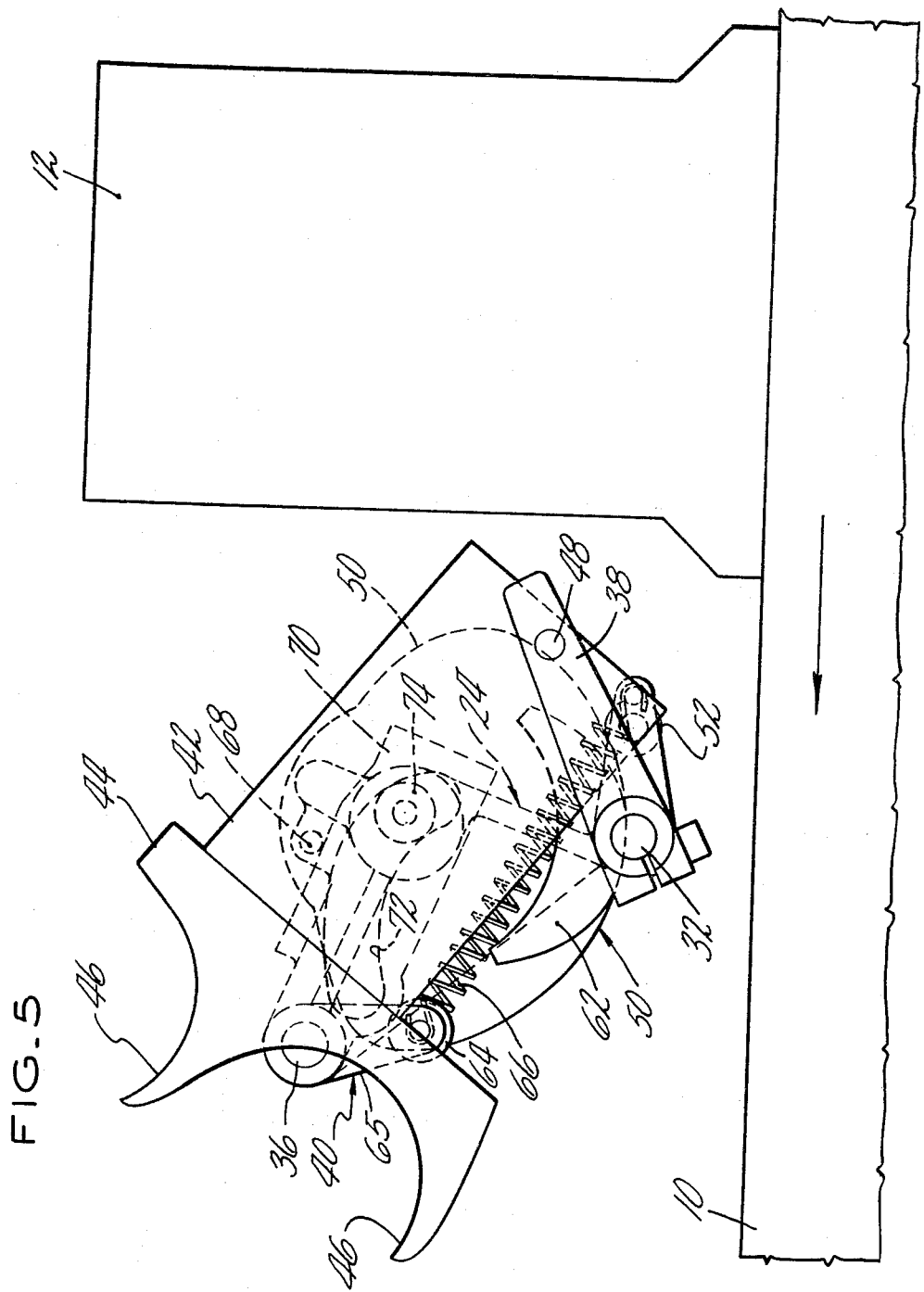

United States Patent Office 3,318,433
Patented May 9, 1967

3,318,433
APPARATUS FOR MOVING GLASS CONTAINERS ONTO A MOVING CONVEYOR
George E. Rowe, Wethersfield, Conn., assignor to Emhart Corporation, Bloomfield, Conn., a corporation of Connecticut
Filed Nov. 5, 1965, Ser. No. 506,462
8 Claims. (Cl. 198—24)

This invention relates to an apparatus for moving one or more articles from the side of a moving conveyor into a line on the conveyor.

It is the general object of the invention to provide an apparatus of the aforedescribed type which is particularly adapted to sweep a plurality of articles, such as glass containers, onto a moving conveyor and into space on said conveyor in a longitudinal line of similar articles. It is ancillary to this general object of the invention to adapt the element which pushes or sweeps the articles into line so that it can be retracted or removed without disturbing any of the articles in the line.

A more specific object of the invention is to provide an apparatus of this type which is operable automatically and in repeated cycles in timed relationship with movement of the conveyor to fill in a complete or continuous line of articles on the moving conveyor.

It is thought that the apparatus provided in accordance with this invention can be used in a variety of installations to move articles into line on an advancing conveyor. For purposes of illustration, and in its presently preferred form, the apparatus of this invention is shown to be adapted to move glass containers which have just been made in a section of a glassware forming machine into line on a conveyor which transports other containers made on other sections of the same forming machine. Such machines, as shown for example in U.S. Patent No. 1,911,-119 and in my pending U.S. patent application, Ser. No. 110,461, now Patent No. 3,223,511, filed May 16, 1961, comprise a plurality of sections, each of which is capable of making one or more articles of glassware while the other sections are similarly making glassware. These sections are timed to operate so that the articles of glassware made therein will be completed at different times. When completed, the articles of glassware are taken out of the finishing molds and placed on a deadplate for cooling. Then, the articles of glassware are to be moved from the deadplate associated with each section onto a single moving conveyor which is associated with all of the sections. Preferably, the articles of glassware from all sections are moved into a single longitudinally extending line on the conveyor, and the conveyor is timed to operate with the sections so that there will be a continuous line of spaced apart containers moving along the conveyor.

As will be described in greater detail hereinafter, the apparatus of the present invention is adapted to sweep one or more articles, such as glass containers from a deadplate or other fixed support at the side of the conveyor into a longitudinal line of such articles on a continuously moving conveyor. The apparatus includes a rotating head which rotates or is driven in timed relationship with operation of the conveyor and which turns through 360°. The head carries with it a pusher plate which extends outwardly during a portion of the cycle of rotation of the head to engage the article or articles on the deadplate and to sweep them or carry them through a substantial arc onto the conveyor where the articles are released. When releasing the articles, the pusher plate is moved inwardly of the head, and means are provided for retarding the rotational movement of the pusher to be sure that it clears the articles with which it is associated and other articles on the line as it continues its rotary movement with the head.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is a top plan view of an apparatus for moving articles onto a moving horizontal conveyor, the apparatus being shown as particularly adapted for handling glass containers or the like which can be made in a section of a glassware forming machine;

FIG. 2 is a vertical view of the apparatus taken generally as indicated by the line 2—2 of FIG. 1, but with parts shown in vertical cross section to illustrate details of construction;

FIG. 3 is an additional top view of the apparatus similar to FIG. 1, but on an enlarged scale and showing the articles moving onto the conveyor whereas FIG. 1 illustrates the articles in position to be moved onto the conveyor;

FIG. 5 is still another view like FIG. 4, but showing the pusher in a rotated position as it moves toward other articles positioned at the side of the conveyor; and FIG. 6 is a horizontal sectional view taken as indicated by the line 6—6 of FIG. 2.

Figure 4:
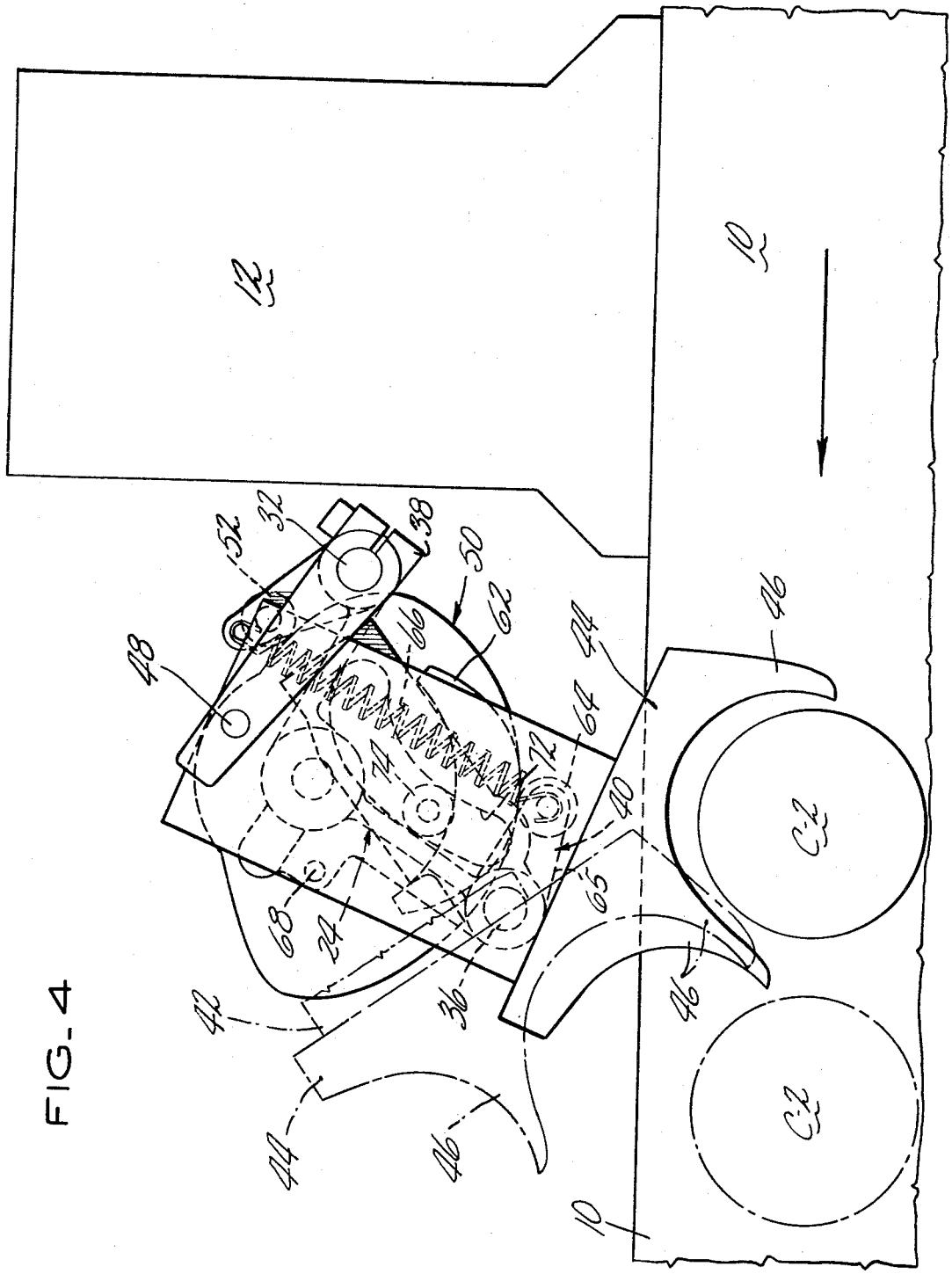
FIG. 4 is a view similar to FIG. 3, but showing the apparatus in a position wherein the pusher element is moving away from the articles on the conveyor.

In the various views of the drawings, the reference numeral 10 indicates a horizontal conveyor which is operated continuously to move from right to left as viewed in FIGS. 1, 3, 4 and 5. This conveyor is driven across the front of a glassware forming machine which has a plurality of sections, each capable of forming glass containers. Preferably, each such section is particularly adapted to make a pair of such containers C–1 and C–2 simultaneously. After being made in the forming machine section, a take-out mechanism forming a part of such section places the glass containers C–1 and C–2 on a deadplate 12 which is located at the side of the conveyor 10, the containers being aligned transversely of the conveyor 10 on the side thereof. As has been mentioned, the apparatus of the present invention can be associated with such machine section to engage the containers on the deadplate 12 and to sweep them through substantially a 90° arc into a longitudinal line on the moving conveyor 10. Since these machine sections are arranged side-by-side, it should be understood that the containers made in one section are to be swept into the line in regularly spaced relationship with the containers swept into the line from other sections.

In order to do this, the apparatus used to move the containers onto the conveyor from each section is operated by a drive shaft 14 (FIGS. 1 and 2) which is common to all sections and which can also be used to provide the drive for the conveyor 10 so that the said conveyor and the apparatus associated with each section will operate in timed relationship.

The drive from the main shaft 14 is transferred to a parallel horizontal shaft 16 by a pair of gears 18, 18, and by means of a bevel gear arrangement, the shaft 16 continuously rotates a vertically upwardly extending shaft 20. The vertical shaft 20 carries a circular plate 22 at its upper end, and an operating head 24 is mounted on this plate to rotate therewith by a spring-loaded detent pin 26 and a retainer ring 28. Thus, the head 24 will rotate with the shaft 20, but in the event of jamming, the detent 26 will become disengaged to permit the shaft 20 to continue to rotate without causing rotation of the head.

As best seen in FIGS. 2 and 6, the head 24 is conveniently formed as a casting having a first boss 30 providing a journal for a first pivot pin or shaft 32 and a second boss 34 providing a journal for a second vertical pivot pin or shaft 36. The first vertical pivot shaft or pin 32 has a first lever 38 secured to its upper end as shown in FIGS. 1–5, and the second pivot shaft or pin 36 has a second lever 40 (FIGS. 1–6) secured to its lower end. These levers 38 and 40 are connected with a pusher plate 42 which is thus rotated with the head 24 but which is nonetheless movable relative thereto. As seen in FIGS. 1, 3–5, the pusher plate 42 has secured to its outer end a pusher element 44 which is provided with a pair of hook-shaped fingers 46, 46. In addition to rotating with the head 24 on the axis of the shaft 20, the pusher plate 42 is to be moved relatively outwardly horizontally from the head from the position shown in FIG. 1 into position to engage the glass containers C–1 and C–2 on the deadplate 12. Then, as the head rotates, the pusher plate is to sweep the said containers from the deadplate into line on the conveyor as shown in FIG. 3. When the containers have reached the broken line position shown in FIG. 3, the pusher 42 is to move inwardly of the head and its rotation is to be retarded so that its fingers will clear the moving containers C–1 and C–2 as the pusher continues to rotate. Such continued rotation of the pusher is shown in FIGS. 4 and 5 and the broken line in FIG. 1 is provided to illustrate the general path of movement of the tip of the lowermost finger 46 during a cycle or revolution of the head.

The first and second levers 38 and 40 are used to impart the outward and inward movement of the pusher and to retard its rotation with the head as desired. More specifically, the first lever 38 is pivotally connected to the pusher plate 42 by a pivot pin 48, and this first lever is caused to pivot relative to the head 24 during rotation thereof by a first cam 50 and a first cam follower 52. The first cam 50 is stationary and it surrounds the head shaft 20. The follower 52 is carried on a crank arm 54 secured to the bottom end of the pivot shaft 32 and it is biased into engagement with the periphery of the first cam 50. As best seen in FIG. 3, the cam 50 has a peripheral portion 56 which causes the follower 52 through the crank 54 to operate the lever 38 so that the pusher plate 42 is thrust outwardly relative to the axis of the shaft 20 and head 24. A second portion 58 of the first cam 50 maintains the outward position of the pusher plate 42, and a third portion 60 on the periphery of the cam 50 is contoured to draw the pusher plate 42 inwardly relative to the head 24 and its vertical shaft 20. It will be seen that this outward and inward movement of the pusher plate 42 relative to the head 24 is generally rectilinear.

A second stationary cam 62 is secured to the first stationary cam 50 to be engaged by a cam following roller 64 carried by a first arm 65 of the lever 40. A spring 66 is connected between the cam following rollers 52 and 64 to urge them toward engagement with the first and second cams 50 and 62, respectively. However, a stop pin 68 projecting upwardly from the head 24 engages a second arm 70 of the lever 40 to limit the inward movement of the follower 64 when it is not in engagement with the cam 62.

This second arm 70 of the lever 40 is provided with an arcuate slot 72 which receives a roller 74 connected to the pusher plate 42. Thus, a camming connection is effected between the lever 40 and the pusher plate 42.

As best seen in FIGS. 3 and 4, when the cam follower 64 engages the second cam 62, the second lever 40 is pivoted relative to the head 24 to change the position of the lever arm 70 and thus change the position of the arcuate slot 72. This causes the roller 74 carried by the pusher plate 42 to follow the said slot and retard the rotation of the pusher plate 42 with the head 24. Thus, since the pusher plate 42 is being moved inwardly relative to the head at the time that its rotation is retarded, the pusher fingers 46, 46 are permitted to be withdrawn from engagement with the released containers C–1 and C–2 and to clear such containers and the other containers in the advancing line on the conveyor 10.

After the containers have passed on on the conveyor and the pusher plate has cleared them, the said pusher plate continues to rotate with the head and it will regain its original position with respect to the head wherein the stop pin 68 is engaged by the lever 40. The pusher plate will then continue to move outwardly as the same follower 52 hits the cam portion 56 to engage the next set of containers on the deadplate 12.

The invention claimed is:

1. An apparatus for sweeping an article from a fixed support at a side of a moving horizontal conveyor and for moving it onto the conveyor, said apparatus comprising a fixed support for articles at the side of the conveyor, a head rotating on a vertical axis, a pusher carried by said head but movable relative thereto and operable to engage said article on said support and to sweep it through a substantial arc onto the conveyor and to then release it while continuing to rotate with the head, a first lever pivotally supported by said head and connected to said pusher, a second lever pivotally supported by said head and having a connection with said pusher, means for pivoting said first and second levers relative to the head during rotation thereof including first and second stationary cams, a cam follower connected to said first lever and engaging said first cam during rotation of the head to move said pusher generally rectilinearly outwardly relative to the head while rotating therewith and into engagement with the article at the side of the conveyor and then generally rectilinearly inwardly relative to the head to release the article on the conveyor, and a cam follower connected to said second lever and engaging said second cam to retard rotation of said pusher with the head during release of the article.

2. An apparatus for moving a plurality of articles from a position at a side of a moving horizontal conveyor into a longitudinal line on the conveyor, said apparatus comprising a head rotating on a vertical axis, a pusher carried by said head but movable relative thereto and having means substantially simultaneously engageable with said articles to sweep them through a substantial arc into the longitudinal line on the conveyor and to then release them while the pusher continues to rotate with the head, a first lever pivotally supported by said head and pivotally connected to said pusher, a second lever pivotally supported by said head and having a camming connection with said pusher, means for pivoting said first and second levers relative to the head during rotation thereof including first and second stationary cams, a cam follower connected to said first lever and engaging said first cam during rotation of the head to move said pusher generally rectilinearly outwardly relative to the head while rotating and into therewith substantially sinultaneous engagement with the articles at the side of the conveyor and then generally rectilinearly inwardly relative to the head to release the articles on the conveyor, and a cam follower connected to said second lever and engaging said second cam during rotation of the head and thereby causing said second lever to cam said pusher and retard its rotation with the head during release of the articles.

3. An apparatus for moving articles onto a conveyor as defined in claim 2 wherein the camming connection between said second lever and said pusher comprises an arcuate slot in one of them and a roller on the other of them riding in said slot to retard rotation of the pusher only when the cam follower on the second lever engages said second cam during release of the articles on the conveyor.

4. Apparatus for moving articles onto a conveyor as set forth in claim 2 wherein the article engaging means on the pusher comprises a plurality of generally hooked fingers engageable respectively with the articles to carry them through the said arc onto the conveyor, the said fingers being moved out of engagement with their associated articles on the conveyor and without engaging other articles on the conveyor by the inward movement and the retarding of the pusher.

5. Apparatus for moving articles onto a conveyor as defined in claim 4 wherein the camming connection between the second lever and the pusher comprises an arcuate slot in one of them and a roller on the other of them riding in said slot.

6. Apparatus for moving articles onto a conveyor as set forth in claim 2 wherein a driven shaft is provided having a detent connection with said head to rotate the same, said detent being releasable in the event said head is blocked to prevent its rotation.

7. An apparatus for moving a plurality of glass containers from a deadplate at a side of a moving horizontal conveyor into space in a longitudinal line of such containers on the conveyor, said apparatus comprising a driven head rotating on a vertical axis in timed relationship to the movement of the conveyor, a pusher plate carried by said head but movable relative thereto and having fingers substantially simultaneous engageable with said plurality of containers to sweep them through a substantial arc off the deadplate and into line on the conveyor where they are released, a first lever pivotally supported by said head and pivotally connected to the pusher plate, a second lever pivotally supported by said head and having a connection with said pusher plate, means for pivoting said first and second levers relative to the head during rotation thereof including first and second stationary cams, a cam follower connected to said first lever and engaging said first cam during rotation of the head to move said pusher plate generally rectilinearly outwardly relative to the head while rotating therewith and into substantially simultaneous engagement with the containers on the deadplate and then generally rectilinearly inwardly relative to the head to release the containers on the conveyor, and a cam follower connected to said second lever and engaging said second cam during rotation of the head and thereby causing said second lever to retard rotation of the pusher plate with the head during release of the containers.

8. An apparatus for moving glass containers onto a conveyor as set forth in claim 7 wherein the pusher plate fingers are hook-shaped to carry the containers through the arc onto the conveyor, and wherein the connection between the second lever and pusher plate comprises an arcuate slot in one of them and a roller on the other of them riding in said slot to retard rotation of the pusher plate only when the cam follower on the second lever engages the second cam during release of the containers and thereby to move the hook-shaped fingers out of engagement with their associated containers and without engaging other containers in the line on the conveyor while the pusher plate is being moved inward and is being retarded relative to the head.

References Cited by the Examiner

UNITED STATES PATENTS

| | | | |
|---|---|---|---|
| 1,654,091 | 12/1927 | Peiler | 198—25 |
| 1,955,577 | 4/1934 | Cooley | 192—150 |
| 2,007,981 | 7/1935 | Nordquist | 198—22 |
| 2,586,865 | 2/1952 | Roselle | 198—30 X |
| 3,176,824 | 4/1965 | Eldred et al. | 198—25 |
| 3,227,260 | 1/1966 | Graves et al. | 198—25 |

FOREIGN PATENTS 737,052  9/1955  Great Britain.

EVON C. BLUNK, *Primary Examiner.*

M. L. AJEMAN, *Assistant Examiner.*